(12) United States Patent
Goertzen

(10) Patent No.: US 6,636,643 B1
(45) Date of Patent: Oct. 21, 2003

(54) SYSTEM AND METHOD FOR IMPROVING COMPRESSED IMAGE APPEARANCE USING STOCHASTIC RESONANCE AND ENERGY REPLACEMENT

(75) Inventor: Kenbe D. Goertzen, Topeka, KS (US)

(73) Assignee: Quvis, Inc., Topeka, KS (US)

( * ) Notice: Subject to any disclaimer, the term of this patent is extended or adjusted under 35 U.S.C. 154(b) by 0 days.

(21) Appl. No.: 09/498,925

(22) Filed: Feb. 4, 2000

Related U.S. Application Data
(60) Provisional application No. 60/118,571, filed on Feb. 4, 1999.

(51) Int. Cl.[7] .................................................. G06K 9/36
(52) U.S. Cl. ...................................................... 382/240
(58) Field of Search .............................. 382/232, 233, 382/236, 238, 240, 248, 250; 348/384.1, 394.1, 395.1, 400.1–404.1, 407.1–416.1, 420.1–421.1, 425.2, 430.1, 431.1; 375/240.02–240.08, 240.11–240.16, 240.18–240.2, 240.22–240.25; 341/51, 63, 65, 67, 107; 364/724.011, 724.04, 724.05, 724.13, 724.14, 725.1–725.2

(56) References Cited

U.S. PATENT DOCUMENTS

| | | | |
|---|---|---|---|
| 5,454,051 A | 9/1995 | Smith | 382/233 |
| 5,852,682 A | 12/1998 | Kim | 382/268 |
| 5,907,636 A | 5/1999 | Nakahara | 382/233 |
| 5,974,186 A * | 10/1999 | Smith et al. | 382/240 |
| 6,134,350 A * | 10/2000 | Beck | 382/240 |
| 6,141,446 A * | 10/2000 | Boliek et al. | 382/233 |
| 6,215,422 B1 * | 4/2001 | Henry et al. | 341/51 |
| 6,298,160 B1 * | 10/2001 | Goertzen | 382/232 |

* cited by examiner

Primary Examiner—Jose L. Couso
(74) Attorney, Agent, or Firm—Bromberg & Sunstein LLP

(57) ABSTRACT

A method for improving the image quality of a compressed image is provided. The improvement relates to the addition of certain error components resulting a less "clean" image, also referred to as the "film look". The system and method perform a subband transforms on one or more images, wherein the image is split into one or more high frequency or low and DC frequency components. Responsive to a component containing DC frequencies, the data in that component is linearized. The linearized data in that component is then dequantified. Preferably, linearizing the data includes adding a function that has a probability and magnitude distribution similar to quantification error of the data. Furthermore, linearizing the data may include using a function that is exactly reproducible and generates random values that closely model the quantification error distribution.

15 Claims, No Drawings

SYSTEM AND METHOD FOR IMPROVING COMPRESSED IMAGE APPEARANCE USING STOCHASTIC RESONANCE AND ENERGY REPLACEMENT

RELATED APPLICATION

This Application claims benefit of provisional No. 60/118,571 filed Feb. 4, 1998.

The subject matter of this application is related to the subject matter of the following commonly owned applications: Ser. No. 09/112,668, now U.S. Pat. No. 6,298,160 titled "Apparatus And Method For Entropy Coding", filed on Jul. 9, 1998, also by Kenbe Goertzen; Ser. No. 09/498,323, titled "Scalable Resolution Motion Image Recording And Storage System", filed concurrently", also by Kenbe Goertzen; Ser. No. 09/498,925, titled "A System And Method For Improving Compressed Image Appearance Using Stochastic Resonance And Energy Replacement", filed concurrently", also by Kenbe Goertzen; Ser. No. 09/498,924, now U.S. Pat. No. 6,532,308 titled "Quality Priority Image Storage and Communication", filed concurrently", also by Kenbe Goertzen: the contents of which are incorporated by reference as if fully disclosed herein.

FIELD OF INVENTION

This invention related to image processing methods and more particular to a system and method for using stochastic resonance and image replacement to improve the appearance of a compressed image.

SUMMARY OF THE RELATED ART

Various compression approaches are in use today which generate undesirable artifacts. These artifacts are often on fixed boundaries, or consist of patterns uncommon in natural images. For example, Discrete Cosine Transforms of images is a technique widely used to reduce the amount of data in an image file. This consists of transforming parts of the image, typically blocks of 8×8 or 16×16 pixels. This method is limited in efficiency because it does not take full advantage of features which cross block boundaries, and it tends to generate tiled artifacts at block boundaries which are very obvious to viewers.

Compression methods, such as full image wavelet transforms, can be used to avoid some of the traditional classes of artifacts. The resulting images can still have an unnatural appearance due to the lack of noise and due to image elements blurring together unnaturally as a result of the subband or wavelet processing. At extreme compression levels, the quantified data sets do not adequately represent the original continuous image. These result in artifacts described as "flat", "blurry", "lumpy", "speckled", "ringing", or "evaporating".

SUMMARY OF INVENTION

The system and method of the present invention take advantage of a stochastic resonance-type process to improve the information transfer, compensate for the quantification error, and replace any energy removed by the quantification process with the appropriate uncertainty in the output. In this way, complete compensation for any unnatural appearance in the resulting image due to quantification error is achieved. As the compression is increased, the resulting image has the appearance of being seen or photographed under progressively worse lighting conditions. It retains its natural appearance, while the information content and perceived quality degrades in a very natural and acceptable manner, with none of the traditional compression artifacts.

The present invention manipulates the component data classes resulting from subband partitioning of an image or signal to improve the efficiency and characteristics of the resulting signal. The result can most easily be described as producing a "film look" as a result of how quantification uncertainty is manipulated.

In the preferred embodiment of the present invention, a subband transform is performed on an image generating components that represent either high or low and DC frequency components. The data components which contain DC information are linearized by the addition of a function that has a probability and magnitude distribution similar to the quantification error. The linearizing function is a generator of random values chosen so that it is exactly reproducible and provides a reasonably close model of the error distribution. In the final step, the data is then dequantified by the reverse process, which can range from a simple linear multiplication, to complex nonlinear, adaptive, and table lookup processes.

In an alternative embodiment, a method is provided which linearizes large magnitude signals only and can avoid the increased size problem by operating on values which result in quantified magnitudes other than 0. In this embodiment, the linearizing function distribution is chosen as in the preferred embodiment but is now used to modulate the quantification function around zero. Ideally the selected linearizing function distribution will have a minimum range matching the original zero range and a maximum range equal to the original range plus the linearizing function range. This results in an increase in the number of zero values while at the same time linearizing the quantifier for large magnitude values. The result is then dequantified by reproducing the linearizing function and reversing the quantification process. To dequantify zero values, a dither function with a distribution similar to the quantification error may be used as the range resulting from dequantification of zero values is not linearized. In both cases, the subbands are then recombined to create a new image with the enhanced "film look".

BRIEF DESCRIPTION OF THE DRAWINGS (None)

DETAILED DESCRIPTION

The present invention manipulates the component data classes resulting from subband partitioning of an image or signal to improve the efficiency and characteristics of the resulting signal. The result can most easily be described as producing a "film look" as a result of how quantification uncertainty is manipulated. The following steps will be described as being performed on a computer for illustrations purposes only. As is well known in the art, any apparatus capable of performing the necessary steps and calculations may be used.

The method begins by applying a subband transform to the image. After a subband transform there are two or more sets of components representing various frequency components of the original image. In the discussion below a distinction is made between the bands of component data that contain DC and low frequency information and the bands that contain only high frequency information.

In the quantification step, which may utilize a number of processes including linear division, complex nonlinear functions, adaptive, or table lookup processes, the data which contains DC information is linearized by the addition of a function with a probability and magnitude distribution similar to the quantification error. The quantification error will depend on implementation details but will typically be a distribution of error values centered on an error value of 0 and the values will predominantly fall in the range of plus or minus the quantification range over two. The quantification range may be a function of the original value's magnitude or may be a function based on other features.

The linearizing function is a generator of random values chosen so that it is exactly reproducible and provides a reasonably close model of the error distribution. If the magnitude of the linearizing function is chosen so that it is the largest magnitude distribution which has little if any impact on the encoded size, the point of maximum information transfer is realized. The data is then dequantified by the reverse process, which can range from a simple linear multiplication, to complex nonlinear, adaptive, and table lookup processes. After dequantification, the linearizing function is exactly reproduced and subtracted from the result by repeating the generating process. This produces a result with more resolution on a statistical basis than would have been present otherwise.

The same method can be used for the high frequency components, but the magnitude of a linearizing function which does not significantly increase the encoded size will typically be very low, resulting in little advantage. This is because of the large population of exactly zero values in these components after quantification.

In an alternative embodiment, a method is provided which linearizes large magnitude signals only and can avoid the increased size problem by operating on values which result in quantified magnitudes other than 0. In order for zero values to appear to result in similar distributions appropriate to the quantification error after dequantification, a model of the quantification error should be added to zero values.

One way to implement this is to use the linearizing function to control the amount of coring which occurs around zero. In this case, the linearizing function distribution is chosen as before, but is now used to modulate the quantification function around zero, with a minimum range matching the original zero range, and a maximum range equal to the original plus the linearizing function range. This results in an increase in the number of zero values while at the same time linearizing the quantifier for large magnitude values. Once again, linearizing function magnitude can be chosen as that magnitude which does not significantly increase the resulting size. The result may then be dequantified by reproducing the linearizing function and reversing the quantification process. To dequantify zero values, a dither function with a distribution similar to the quantification error can be added, because the range resulting from dequantification of zero values has not been linearized.

This process linearizes the resolution of the signal, optimize the information transfer through the quantifier and entropy coder, in the resulting image, accurately represents the uncertainty introduced during image capture or the "film look".

I claim:

1. A method for improving the image quality of a compressed image, the method including the steps of:
   a. performing a subband transform on the image, wherein the image is split into one or more high frequency or low and DC frequency components;
   b. quantizing the components; and
   c. applying a linearizing function to at least one component, the linearizing function having a probability distribution that is substantially that of quantification error to add noise into the signal that was removed during quantization.

2. The method of claim 1, wherein the step of linearizing includes using a function that it is exactly reproducible and generates random values that closely model the quantification error distribution.

3. The method of claim 1, further comprising dequantifying the data, wherein the step of dequantifying the data includes a simple linear multiplication algorithm.

4. The method of claim 1, further comprising dequantifying the data wherein the step of dequantifying the data includes applying a complex nonlinear dequanalgorithm.

5. The method of claim 1, further comprising dequantifying the data wherein the step of dequantifying the data includes applying an adaptive dequantification algorithm.

6. The method of claim 1, further comprising dequantifying the data wherein the step of dequantifying the data includes a table lookup process.

7. A system for improving the image quality of a compressed image, the system including:
   a. a processor, wherein the processor is capable of performing the steps of:
      i. performing a subband transform on the image such that the image is divided into frequency components;
      ii. linearizing the data in at least one component after the data has been quantized to add noise into the image that was removed during quantization;
      iii.
   b. coupled to the processor, one or more memory modules for dynamically storing the image;
   c. coupled to the memory, function memory for storing one or more equations used to linearize data of the image; and
   d. coupled to the processor, memory modules and function memory, a communication bus that provides a digital communications link between the processor, the memory modules, and the function memory of the system.

8. The system of claim 7, wherein the function memory includes one or more function that it are exactly reproducible and generate random values that closely model the quantification error distribution for a given image data sample.

9. The system of claim 7, wherein the function memory includes a simple linear multiplication algorithm.

10. The system of claim 7, wherein the function memory includes a complex nonlinear dequantification algorithm.

11. The system of claim 7, wherein the function memory includes an adaptive dequantification algorithm.

12. The method according to claim 1, wherein the linearizing function has a first part and a second part wherein in the step of applying the linearizing function, the first part is applied to data having a magnitude above a threshold wherein the first part has a function having a probability distribution that is substantially that of quantification error and the second part is applied to data having a magnitude below a threshold and the second part increases the number of zero values in the data.

13. The method according to claim 12, further comprising:
   applying a dithering function having a probability distribution that is substantially that of quantification error to data that was originally below the threshold; and
   dequantifying the data.

14. The system according to claim 7, wherein in the processor the linearizing function has a first part and a second part wherein in the step of applying the linearizing function, the first part is applied to data having a magnitude above a threshold wherein the first part has a function having a probability distribution that is substantially that of quantification error and the second part is applied to data having a magnitude below a threshold and the second part increases the number of zero values in the data.

15. The system according to claim 14, wherein the processor upon decoding applies a dithering function having a probability distribution that is substantially that of quantification error to data that was originally below the threshold; and dequantifies the data.

* * * * *